United States Patent [19]

Nakayama et al.

[11] Patent Number: 4,619,861
[45] Date of Patent: Oct. 28, 1986

[54] MAGNETIC POWDERS WITH IMPROVED DISPERSIBILITY

[75] Inventors: Masatoshi Nakayama; Haruyuki Morita, both of Saku; Yuichi Kubota, Komoro, all of Japan

[73] Assignee: TDK Corporation, Tokyo, Japan

[21] Appl. No.: 756,933

[22] Filed: Jul. 19, 1985

Related U.S. Application Data

[63] Continuation of Ser. No. 504,775, Jun. 16, 1983, abandoned.

[30] Foreign Application Priority Data

Jun. 18, 1982 [JP] Japan ................................. 57-103929
Jun. 18, 1982 [JP] Japan ................................. 57-103930

[51] Int. Cl.⁴ .............................................. B32B 5/16
[52] U.S. Cl. ............................ 428/220; 29/DIG. 28; 29/DIG. 95; 29/603; 148/31.5; 148/31.55; 148/100; 148/105; 252/62.54; 252/62.55; 252/62.56; 252/62.58; 252/62.63; 360/131; 360/134; 365/171; 427/127; 427/128; 427/130; 427/216; 427/220; 428/339; 428/407; 428/457; 428/692; 428/694; 428/900; 428/928

[58] Field of Search ............... 428/900, 220, 339, 407, 428/457, 692, 694, 928; 427/35–41, 127–132, 216, 220; 252/62.51, 62.54, 62.55, 62.56, 62.58, 62.63; 29/DIG. 28, DIG. 95, 603; 148/31.5, 31.55, 100, 105; 360/131, 134; 365/171

[56] References Cited

U.S. PATENT DOCUMENTS

| | | | |
|---|---|---|---|
| 3,935,340 | 1/1976 | Yamaguchi et al. | 427/216 |
| 4,197,347 | 4/1980 | Ogawa et al. | 428/900 |
| 4,260,466 | 4/1981 | Shirahata et al. | 427/35 |
| 4,333,961 | 6/1982 | Bruce et al. | 427/131 |
| 4,373,004 | 2/1983 | Asano et al. | 428/328 |
| 4,419,404 | 12/1983 | Arai et al. | 427/131 |
| 4,429,024 | 1/1984 | Ueno et al. | 427/131 |
| 4,490,505 | 12/1984 | Pendergrass | 427/128 |
| 4,495,242 | 1/1985 | Arai et al. | 428/900 |
| 4,521,482 | 6/1985 | Arai et al. | 428/900 |

Primary Examiner—Stephen J. Lechert, Jr.
Attorney, Agent, or Firm—Seidel, Gonda, Goldhammer & Abbott

[57] ABSTRACT

Magnetic powders have a thin film of a nitrogen- or sulfur-containing organic polymer synthesized on the individual particles by plasma polymerization. The film is not more than 100 Å in thickness.

7 Claims, 2 Drawing Figures

MAGNETIC POWDERS WITH IMPROVED DISPERSIBILITY

This application is a continuation of application Ser. No. 504,775, filed June 16, 1983, abandoned.

BACKGROUND OF THE INVENTION

This invention relates to magnetic powders with modified surfaces for improved dispersibility in binders for the manufacture of magnetic recording media, such as magnetic tapes and discs. More particularly, the invention is concerned with magnetic powders the individual particles of which have a thin coating film formed by plasma polymerization of an organic material containing nitrogen or sulfur.

Ordinary magnetic tapes are made by mixing a ferromagnetic powder of $\gamma$-$Fe_2O_3$ or other oxide with binder ingredients and then applying the resulting magnetic coating material on a base. The magnetic powders in wide use, e.g., $\gamma$-$Fe_2O_3$, have hydrophilic groups such as hydroxyl in the surface layers, and the low affinities for binders organic by nature make them hardly dispersible uniformly in the binders. With the ferromagnetic metal powders for metal tapes the uniform dispersion in the binders is even more difficult because, in addition to the —OH and other hydrophilic functional groups on the surface, the powders have higher surface flux densities than $\gamma$-$Fe_2O_3$ and tend to aggregate objectionably.

For every magnetic recording medium the uniform dispersibility of the magnetic powder in the binder is an important determinant of its performance in relation to the improvements in the packing properties, squareness ratio Br/Bm, etc. In view of this, proposals have already been made to render the magnetic particle surfaces hydrophobic and more affinitive for binders. They include:

(1) Coating inorganic particles with a dispersant.
(2) Coating inorganic particles with a high molecular compound, in the following ways:
  (a) Coating with an aqueous high molecular compound.
  (b) Coating with an organic solvent type high molecular compound.
  (c) Coating by radiation polymerization.
  (d) Coating by ultraviolet polymerization.
  (e) Coating by mechanochemical polymerization.
  (f) Coating by microcapsule technique.
(3) Deposition of a certain substance on particular surface, followed by a heat treatment.

In the method (1), most of the dispersant simply and lightly sticks to the particle surface rather than being adsorbed on the latter in a relatively effective way. Moreover, the amount sticking to the particle surface is so large that, if they are used as such, blooming will occur. Washing the dispersant off the surface would remove the smaller adsorbed portion too, thus losing the coating effect. Furthermore, the operation will lack stability and continuity. For these reasons the method (1) is unpractical. For the coating with a high molecular compound (the method (2)), different approaches (a) to (f) have been proposed. However, none of them have, after all, succeeded in effecting uniform coating without uniformly dispersing the particles in the polymer solution. Ordinarily, such treatments are required because of the poor dispersibility of the particles in organic binders, and nevertheless the treatments themselves have to depend on good dispersibility of the particles for their success. This is, in a sense, a self-contradiction, and therefore the second method including their modifications are unacceptable. Another factor that hinders the commercial acceptance is that in those dispersion systems the inorganic powders and high molecular compounds tend to aggregate together for objectionable size enlargement, imparting undesirable effects upon the dispersion of the particles. The method (3) has shortcomings in that it is not suited for mass production because of a low rate of treatment and that it involves difficulties in controlling the surface conditions of the magnetic particles as desired.

Mechanical dispersion by a pearl mill, three-roll mill, ball mill or the like is also in common use. Even this fails often to ensure adequate dispersion. A fatal drawback is that a prolonged treatment for mechanical dispersion can break the acicularity or other structural features of the magnetic particles. Thus mechanical dispersion has its limitations in use.

The polymeric coating films for the purpose of improving the powder dispersibility should be evenly and thinly formed on the particles. From this viewpoint none of the above-mentioned methods of the prior art are satisfactory.

Under such circumstances, development of a novel polymeric coating method to replace the foregoing has been called for in order to attain improvements in electrical properties as well as in the packing properties through increased dispersibility of magnetic powders and prevent dusting of the powders. After our intensive studies about the method for polymeric coating of magnetic particles with a uniform and thin film in a stabilized operation, it has now been found that the end is best attained by forming a film of a nitrogen- or sulfur-containing organic material by plasma polymerization on magnetic particles. The present invention is based upon this discovery.

DETAILED DESCRIPTION

Figure 1:
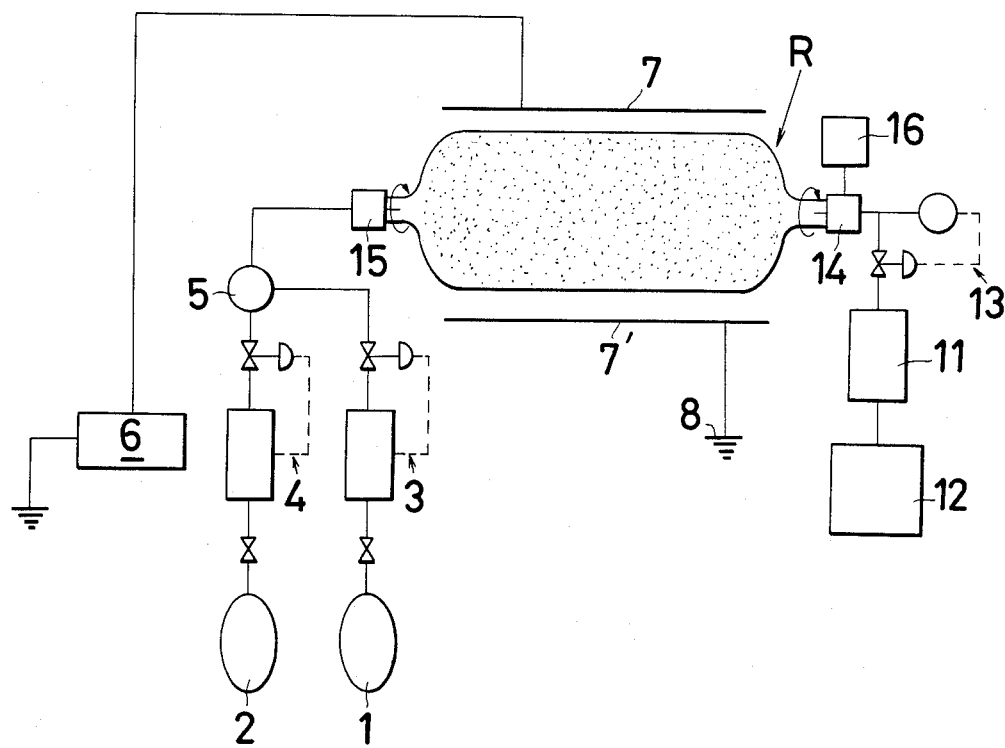
FIG. 1 is a schematic diagram of an apparatus for powder coating by high-frequency plasma polymerization in accordance with the invention.

The process of plasma polymerization consists of mixing a discharged plasma of a carrier gas, e.g. Ar, He, $H_2$, or $N_2$, with a plasma-polymerizable organic monomer gas, and bringing the mixed gas and the particles to be treated into contact so as to form a plasma-polymerized film thereon.

The principle of plasma polymerization will now be briefly explained. An electric field is applied to a gas kept at a low pressure, and the free electrons present in a small proportion in the gas are subjected to an electric field acceleration because of the much larger intermolecular distance than under ordinary pressure, and they acquire a kinetic energy (electron temperature) of 5 to 10 eV. As the atoms at this velocity collide with other atoms or molecules, they break the atomic or molecular orbitals and dissociate them into normally instable chemical species, such as electrons, ions, and neutral radicals. The dissociated electrons are again subjected to the field acceleration to dissociate, in turn, other atoms and molecules. This chain action quickly changes the gas to a highly ionized state, or to the form known as a plasma gas. With few chances of collision with electrons, the gas molecules absorb little energy and are kept at a temperature close to the ordinary level. The system in which the kinetic energy of electrons (electron temperature) and the thermal motion of the molecules (gas temperature) have thus separated is called a low temperature plasma, where the chemical species comparatively retain their original forms and are in conditions ready for an additive chemical reaction such as polymerization. The present invention takes advantage of the above conditions in forming a plasma-polymerized film over particles. Because the low temperature plasma is utilized, there is no unfavorable thermal effect upon the powder.

The grounds on which plasma polymerization is deemed best suited for the polymeric coating of magnetic particles may be itemized as below:

(1) The plasma polymerization, which uses a gaseous system, produces a greater permeative force than with a liquid system.

(2) The process can give a uniform, thin film on the surface of every shape, plane or spherical, regular or irregular.

(3) Because the concentrations of active species (cation, anion, and radical species) per unit volume of the material for the plasma polymerization are by far the higher than in ordinary polymerization, an adequately uniform film is formed on particles of a large specific surface area, especially on finer particles.

(4) Its film forming process being a dry process, the plasma polymerization requires no solvent but permits a direct treatment. Thus, the steps of choosing, replacing, and dispersing the solvent can be eliminated.

(5) The plasma-polymerized film is uniform with a thickness in the range of 0.1 to 10,000 Å whereas uniform films thinner than 100 Å cannot be formed conventionally.

(6) The process does not impair the physical properties or morphological features, especially the acicularity, of magnetic particles.

Plasma polymerization permits hydrocarbons and other organic compounds in general to be polymerized. Under the invention it has now been found that even greater dispersibility can be imparted to magnetic powders by forming a nitrogen- or sulfur-containing organic polymer film on the magnetic particles. Examples of suitable plasms-polymerizable monomer gases to form nitrogen-containing organic polymer films in accordance with the invention are as follows:

Imidazole, pyrazole, triazole, tetrazole, benzoxazole, benzothiazole, benzoimidazole, benzotriazole, oxathiazole, benzoxythiazole, indole, indolenine, oxyindole, carbazole, nitrocarbazole, aminocarbazole, pyridine, picoline, ethylpyridine, propylpyridine, isopropylpyridine, butylpyridine, dimethylpyridine, trimethylpyridine, 2-vinylpyridine, 3-vinylpyridine, 4-vinylpyridine, 2-methyl-5-vinylpyridine, 5-ethyl-2-vinylpyridine, 3-allylpyridine, 2-benzylpyridine, 4-benzylpyridine, phenylpyridine, 2,2'-dipyridyl, 2,3'-dipyridyl, 2,4'-dipyridyl, chloropyridine, bromopyridine, nitropyridine, aminopyridine, aminomethylpyridine, cyanopyridine, quinoline, propylquinoline, butylquinoline, phenylquinoline, lepidine, methylquinoline, nitroquinoline, isoquinoline, methylisoquinoline, nitroisoquinoline, acridine oxazine, thiazine, benzothiazine, pyridazine, aminopyridazine, cinnoline, aminocinnoline, pyrimidine, aminopyrimidine, pyrazine, 2-methylpyrazine, 2,5-dimethylpyrazine, piperazine, quinoxaline, triazine, tetrazine, nitromethane, nitroethane, nitropropane, nitrobutane, nitrohexane, nitroethylene, nitropropane, nitrobutene, nitropentadiene, nitropentene, nitrohexane, nitroheptene, nitrooctene, dinitroethane, dinitropropane, trinitromethane, tetranitromethane, methylamine, trimethylamine, isobutylamine, isoamylamine, methylenediamine, ethylenediamine, 1,2,3-triaminopropane, ethyleneimine, trimethyleneimine, cyclic polymethyleneimine, dipropargylamine, tripropargylamine, N,N-dimethylpropargylamine, N,N-diethylpropargylamine, nitrobenzene, dinitrobenzene, nitrosobenzene, nitrotoluene, toluidine, N-methylaniline, N-ethylaniline, N,N-dimethylaniline, N,N-diethylaniline, diphenylamine, formanilide, N-methylpyrrolidone, and vinylpyrrolidone.

Examples of suitable plasma-polymerizable monomer gases to form sulfur-containing organic polymer films are as below:

Thiazole, isothiazole, thiadiazole, thiatriazole, oxathiazole, benzoxathiazole, thiazine, benzothiazine, trimethylene sulfide, thiophene, methylthiophene, dimethylthiophene, trimethylthiophene, ethylthiophene, isopropylthiophene, 2-vinylthiophene, 3-vinylthiophene, 2-thienylacetylene, 3-thienylacetylene, nitrothiophene, aminothiophene, thianaphthene, dithiolan, oxathiolan, tetrahydrothiopyran, thiachromangithiane, methyl mercaptan, ethyl mercaptan, allyl mercaptan, ethyl sulfide, vinyl sulfide, allyl sulfide, thidiglycol, trithioacetone, methylene dimethyl mercaptal, acetone diethyl mercaptol, ethanethiolic acid, ethanethionic acid, ethanethionothionic acid, thioformamide, methyl sulfoxide, ethyl sulfoxide, divinyl sulfone, diallyl sulfone, allylvinyl sulfone, methanesulfonic acid, ethanesulfonic acid, propanesulfonic acid, butanesulfonic acid, pentanesulfonic acid, hexanesulfonic acid, ethylenesulfonic acid, 1-propane-1-sulfonic acid, thiophenol, thiocresol, thionylaniline, benzenesulfonic acid, benzenesulfinic acid, methyl toluenesulfonate ester, and phenolsulfonic acid.

In accordance with the invention a thin nitrogen- or sulfur-containing plasma-polymerized film is evenly formed on magnetic particles without impairing the strength and other physical properties, specific surface area, acicular ratio, and other morphological features of the magnetic powder, thus achieving a marked improvement in the dispersibility of the powder. With a thickness of less than 100 Å, a plasma-polymerized film achieves its advantageous effect, and the adverse effect of the film, if any, upon the end product is negligible.

The magnetic powders to which the present invention are applicable include pulverized $\gamma$-Fe$_2$O$_3$ and Fe$_3$O$_4$ with or without doping or coating with cobalt or the like, CrO$_2$, barium ferrite, ferromagnetic metal powders (e.g., Fe, Co, Ni, Fe-Ni, Fe-Co, Fe-Ni-Co, Co-Ni, Fe-Co-B, Fe-Co-Cr-B, Mn-Bi, Mn-Al, and Fe-Co-V) and iron nitride powder.

Figure 2:
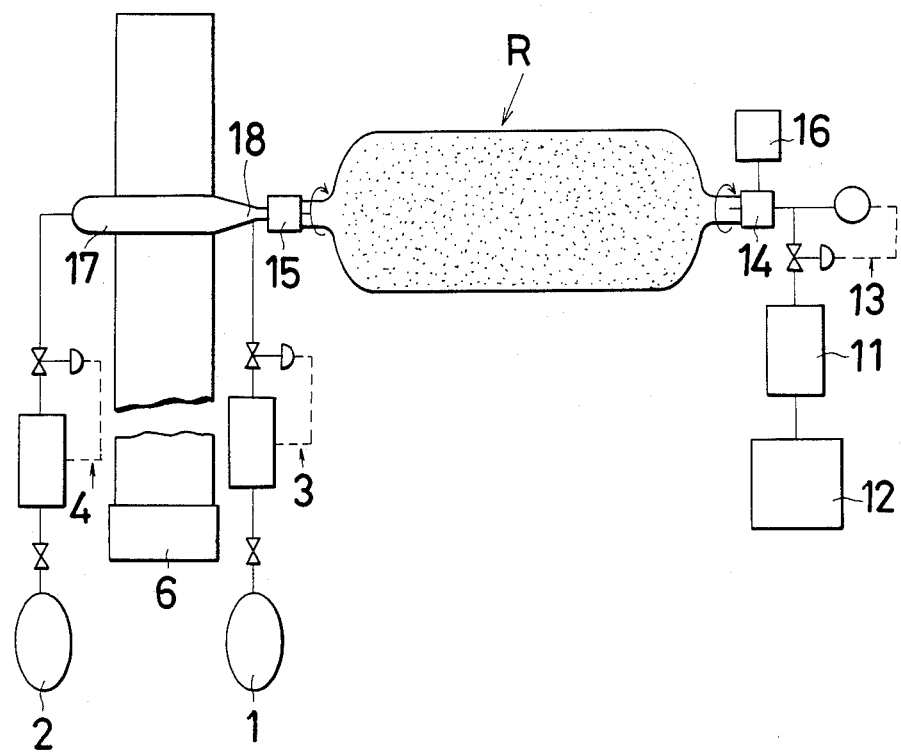
FIG. 2 is a diagram similar to FIG. 1 but showing an apparatus for microwave plasma polymerization according to the invention.

Referring now to FIGS. 1 and 2, there are shown two types of plasma polymerizers for coating magnetic particles with a plasma-polymerized film. FIG. 1 shows a plasma polymerizer which depends on high-frequency discharge and FIG. 2, a plasma polymerizer that uses microwave discharge.

In FIG. 1 the symbol R designates a rotary polymerization reaction vessel made of glass, quartz or the like. The horizontal vessel is provided on its openings at opposite ends with rotary joints 14, 15, and it can be driven at a predetermined rotating velocity by a motor 16. The rotary joints are detachable and, after removing them, a magnetic powder is introduced into the reaction vessel R. A monomer gas and a carrier gas from their respective sources 1, 2 are supplied via mass flow controllers 3, 4 and through a mixer 5 to the reaction vessel at the rotary joint 15. The supply pipings are connected to the joint 15 with magnetic fluid seals. The monomer gas is chosen, as explained above, to be a plasma-polymerizable organic gas containing nitrogen or sulfur. The carrier gas is suitably chosen from among Ar, He, $H_2$, $N_2$, etc. A pair of electrodes 7, 7' are disposed in parallel, along the reaction vessel R in between. On electrode 7 is connected to a high-frequency power source 6 and the other electrode 7' is grounded at 8. The vessel R is equipped with a vacuum system for its evacuation, which comprises a liquid nitrogen trap 11, a rotary oil-seal pump 12, and a vacuum controller 13. This vacuum system is connected through a magnetic fluid seal to the rotary joint 14.

In operation, the rotary joints are detached from the reaction vessel 5 and a magnetic powder to be treated is fed. The vessel is then slowly evacuated by the rotary oil-seal pump 12 to a vacuum degree of $10^{-2}$ Torr or more. Following this, the monomer and carrier gases are supplied at predetermined flow rates as a mixture into the vessel. The degree of vacuum inside the reactor is maintained within the range of 0.01 to 10 Torr by the vacuum controller 13. After the operations of the supply and vacuum systems have become steady, the reaction vessel is caused to rotate, e.g., at 20 to 70 rpm, and then electric power at a high frequency from the source 6 is applied. The feed rates of the monomer and carrier gases are preselected according to the amount of the powder to be charged into the vessel and the desired film thickness to be attained, and the point of time at which the plasma color characteristic of monomer disappears due to the consumption of the monomer is fixed as the end point of the reaction. As the reaction vessel turns, the mixed plasma gas spreads through the particles dispersed and suspended inside the vessel to form a highly adhesive plasma-polymerized film on the individual particles.

FIG. 2 illustrates a microwave-discharge plasma polymerizer, with the parts like those in FIG. 1 given like symbol or numbers. Here the reaction vessel R is formed with a plasma chamber 17 as a horizontal extension from one side of the vessel, e.g., beyond the rotary joint 15, to be supplied at the outer end with the carrier gas from the source 2. The carrier gas fed to the chamber 17 is ionized to a plasma by the oscillation of a magnetron 6 and is stabilized as such. The monomer gas is introduced into the plasma chamber at a constriction 18 formed at the other end. The rest of elements are all the same as those shown in FIG. 1.

For the plasma source, DC, AC or other discharge may be utilizes as well as the high-frequency or microwave discharge so far described. In the DC and AC discharge, the plasma polymerization can be effected by the interior-electrode procedure.

The invention is illustrated by the following examples and comparative examples.

A. Formation of nitrogen-containing plasma-polymerized films

Example 1

Using the apparatus of FIG. 1, a plasma-polymerized film was deposited on magnetic particles of $\gamma$-$Fe_2O_3$. The conditions for the plasma polymerization were as follows:

| | |
|---|---|
| Monomer gas | Pyridine |
| Monomer gas flow rate | 1 ml/min |
| Carrier gas | Argon |
| Carrier gas flow rate | 5 ml/min |
| Degree of vacuum | 0.5 Torr |
| Quantity of $\gamma$-$Fe_2O_3$ fed | 50 g |
| Reaction vessel rotating velocity | 50 rpm |
| High-frequency power supply | 13.56 MHz 50 W |

The monomer and carrier gases were supplied for 10 minutes and the point of time at which the monomer in the vessel was totally consumed and the plasma color characteristic of the monomer disappeared was regarded as the end point of the reaction.

The results of the $\gamma$-$Fe_2O_3$ analyses of the thus-obtained plasma-polymerized thin film and of an untreated film with a CHN coder were as tabulated below:

| | C % | H % | N % |
|---|---|---|---|
| Untreated $\gamma$-$Fe_2O_3$ | 0.10 | 0.05 | 0.00 |
| Polymer-coated $\gamma$-$Fe_2O_3$ | 0.30 | 0.07 | 0.07 |

The thin film formed in conformity with the invention was examined for its composition with a Fourier-transformation infrared spectrophotometer and by electron spectroscopy for chemical analysis (ESCA). The film composition was confirmed to be a nitrogen-containing polymer.

Example 2

Using the apparatus of FIG. 2, a film was deposited by microwave-discharge plasma polymerization on 50 grams of magnetic particles of Co-doped $\gamma$-$Fe_2O_3$. The conditions employed were the same as those in Example 1, with the exception that a power of 100 W with a microwave at a frequency of 2450 MHz under the oscillation by the magnetron was applied and, after the stabilization of the resulting plasma, 2-vinylthiophene was fed at a rate of 1 ml/min.

Analytical results with a CHN coder were as follows:

| | C % | H % | N % |
|---|---|---|---|
| Untreated Co-doped $\gamma$-$Fe_2O_3$ | 0.05 | 0.05 | 0.00 |
| Polymer-coated $\gamma$-$Fe_2O_3$ | 0.35 | 0.08 | 0.08 |

Example 3

The procedure of Example 1 was followed under the same conditions excepting that nitropropane was used in place of pyridine.

Example 4

The procedure of Example 1 was repeated with the exception that methylamine was used in place of pyridine.

Example 5

In the procedure of Example 2 pyridine was replaced by nitrobenzene.

Example 6

In the procedure of Example 2 pyridine was replaced by ethyleneimine.

Example 7

The procedure of Example 1 was followed with the exception that the monomer and carrier gases were supplied for 30 minutes.

Example 8

The procedure of Example 1 was followed with the exception that the monomer and carrier gases were supplied for one hour.

Comparative Example 1

In Example 1 methane gas was employed as the monomer gas to form a plasma-polymerized film on the particles.

Comparative Example 2

In Example 1 methyl methacrylate was used as the monomer gas and a plasma-polymerized film was formed on the particles.

The thickness of the plasma-polymerized films deposited on the particles in Examples 1 through 8 and in Comparative Examples 1 and 2 were measured with an electron microscope and through the depth analysis by ESCA. The results are shown in the table below.

| Sample | Thickness (Å) |
|---|---|
| Example 1 | 60 |
| Example 2 | 65 |
| Example 3 | 40 |
| Example 4 | 45 |
| Example 5 | 50 |
| Example 6 | 75 |
| Example 7 | 150 |
| Example 8 | 480 |
| Comp. Ex. 1 | 20 |
| Comp. Ex. 2 | 35 |

Dispersibility tests

In order to compare the degrees of dispersion of the magnetic particles treated in Examples 1 through 8 with those of Comparative Examples 1 and 2 and also with untreated $\gamma$-Fe$_2$O$_3$ and co-doped $\gamma$-Fe$_2$O$_3$, the degrees of wetting heat the test particles developed upon immersion in methyl ethyl ketone were measured. The higher the heat of wetting the greater the affinity of the particles for the solvent, and this is a measure of improvement achieved in the dispersibility of the particular particles. The results are given in the table below. Because of perfect coating, the plasma-polymerized film, even less than 100 Å thick, can satisfactorily improve the dispersibility of the particles.

| Magnetic powder | Heat of wetting (cal/g) |
|---|---|
| Untreated $\gamma$-Fe$_2$O$_3$ | 3.0 |
| Untreated Co-doped $\gamma$-Fe$_2$O$_3$ | 3.2 |
| Example 1 | 6.3 |
| Example 2 | 6.5 |
| Example 3 | 5.7 |
| Example 4 | 5.8 |
| Example 5 | 5.9 |
| Example 6 | 6.4 |
| Example 7 | 6.2 |
| Example 8 | 6.4 |
| Comp. Ex. 1 | 4.2 |
| Comp. Ex. 2 | 5.1 |

Magnetic tape performance tests

Magnetic tapes were made in the usual manner but using untreated magnetic powders and the powders treated in Examples 1 through 8 and in Comparative Examples 1 and 2. Each magnetic powder was mixed with other ingredients to the following composition as a magnetic coating material.

| | |
|---|---|
| Magnetic powder | 100 parts |
| Abrasive (Al$_2$O$_3$) | 3 parts |
| Nitrocellulose | 6 parts |
| Epoxy resin ("Epikote 1004") | 4 parts |
| Polyurethane ("Nippollan 5033") | 10 parts |
| Solvent | 250 parts |

This composition was dispersed on a sand mill for 5 hours, and then 4 parts of an isocyanate ("Coronate L") was added. The mixture was applied, while being magnetically oriented, on a 14 $\mu$m-thick polyester film. Each magnetic tape thus obtained was tested for its squareness ratio, Br/Bm, and the amount of dust that comes off the coat, i.e., dusting quantity (mg). The following table shows the results.

The results indicate that the dispersibility, squareness ratio, and dusting of magnetic powders are improved by the formation of a hydrocarbon-type organic polymer film by plasma polymerization on the individual particles as compared with untreated magnetic powders. It is further obvious that even greater improvements are attained by forming a nitrogen-containing organic polymer film in conformity with the present invention.

| Magnetic powder used for tape | Squareness ratio, Br/Bm | Amount of Dusting, mg |
|---|---|---|
| Untreated $\gamma$-Fe$_2$O$_3$ | 0.78 | 1.1 |
| Untreated Co-doped $\gamma$-Fe$_2$O$_3$ | 0.79 | 1.0 |
| Example 1 | 0.92 | 0.2 |
| Example 2 | 0.94 | 0.2 |
| Example 3 | 0.87 | 0.3 |
| Example 4 | 0.88 | 0.4 |
| Example 5 | 0.86 | 0.4 |
| Example 6 | 0.93 | 0.2 |
| Example 7 | 0.92 | 0.2 |
| Example 8 | 0.91 | 0.2 |
| Comp. Ex. 1 | 0.84 | 0.8 |
| Comp. Ex. 2 | 0.85 | 0.7 |

B. Formation of sulfur-containing plasma-polymerized films

Example 1

A plasma-polymerized film was deposited on magnetic particles of $\gamma$-Fe$_2$O$_3$ using the same apparatus as described in Example 1. The conditions for the plasma polymerization were as follows:

| | |
|---|---|
| Monomer gas | 2-Vinylthiophene |
| Monomer gas flow rate | 1 ml/min |
| Carrier gas | Argon |
| Carrier gas flow rate | 5 ml/min |

| -continued | |
|---|---|
| Degree of vacuum | 0.5 Torr |
| Q'ty of $\gamma$-Fe$_2$O$_3$ fed | 50 g |
| Reaction vessel rotating speed | 50 rpm |
| High-frequency power supply | 13.56 MHz 50 W |

The monomer and carrier gases were supplied for 10 minutes and the point of time at which the monomer in the vessel was totally consumed and the plasma color characteristic of the monomer disappeared was regarded as the end point of the reaction.

The thin film so formed was examined with a Fourier-transformation infrared spectrophotometer and by ESCA, and it was confirmed to be a film of a sulfur-containing polymer.

Example 2

A polymer film was deposited by microwave-discharge plasma polymerization on 50 grams of magnetic particles of Co-doped $\gamma$-Fe$_2$O$_3$, using the apparatus of FIG. 2. The conditions employed were the same as those in Example 1, with the exception that a power of 100 W with a microwave at a frequency of 2450 MHz under the oscillation by the magnetron was applied and, after the stabilization of the resulting plasma, 2-vinylthiophene was fed at a rate of 1 ml/min.

As was the case with Example 1, the polymer film composition was that of a sulfur-containing polymer.

Example 3

The procedure of Example 1 was followed under the same conditions with the exception that thiazole was used in place of 2-vinylthiophene.

Example 4

The procedure of Example 1 was repeated with the exception that 3-thienylacetylene was used in place of 2-vinylthiophene.

Example 5

In the procedure under the same conditions as in Example 2, benzenesulfonic acid was employed in place of 2-vinylthiophene.

Example 6

In the procedure of Example 2, methyl mercaptan was used instead of 2-vinylthiophene.

Example 7

The procedure of Example 1 was repeated excepting that the monomer and carrier gases were supplied for 30 minutes.

Example 8

The procedure of Example 1 was repeated excepting that the monomer and carrier gases were supplied for one hour.

Comparative Example 1 (Same as in A)

In Example 1 methane gas was employed as the monomer gas to form a plasma-polymerized film on the particles.

Comparative Example 2 (Same as in A)

In Example 1 methyl methacrylate was used as the monomer gas and a plasma-polymerized film was formed on the particles.

The thickness of the plasma-polymerized films deposited on the particles in Examples 1 through 8 and in Comparative Examples 1 and 2 were measured with an electron microscope and through the depth analysis by ESCA. The results are shown in the table below.

| Sample | Thickness (Å) |
|---|---|
| Example 1 | 45 |
| Example 2 | 50 |
| Example 3 | 65 |
| Example 4 | 80 |
| Example 5 | 40 |
| Example 6 | 30 |
| Example 7 | 110 |
| Example 8 | 250 |
| Comp. Ex. 1 | 20 |
| Comp. Ex. 2 | 35 |

Dispersibility tests

In order to compare the degrees of dispersion of the magnetic particles treated in Examples 1 through 8 with those of Comparative Examples 1 and 2 and also with untreated $\gamma$-Fe$_2$O$_3$ and Co-doped $\gamma$-Fe$_2$O$_3$, the degrees of wetting heat in the test particles developed upon immersion in methyl ethyl ketone were measured in the same manner as described in A above.

The following table gives the results.

| Magnetic powder | Heat of wetting (cal/g) |
|---|---|
| Untreated $\gamma$-Fe$_2$O$_3$ | 3.0 |
| Untreated Co-doped $\gamma$-Fe$_2$O$_3$ | 3.2 |
| Example 1 | 6.6 |
| Example 2 | 6.5 |
| Example 3 | 6.2 |
| Example 4 | 6.7 |
| Example 5 | 5.7 |
| Example 6 | 5.9 |
| Example 7 | 6.4 |
| Example 8 | 6.3 |
| Comp. Ex. 1 | 4.2 |
| Comp. Ex. 2 | 5.3 |

Magnetic tape performance tests

Magnetic tapes were made in the same manner as described in A, using untreated magnetic powders and the powders treated in Examples 1 through 8 and in Comparative Examples 1 and 2. Each magnetic tape thus obtained was tested for its squareness ratio, Br/Bm, and the dusting quantity (mg). The following table shows the results.

The results clearly indicate that the dispersibility, squareness ratio, and dusting of magnetic powders are remarkably improved by the formation of a sulfur-containing organic polymer film on the individual particles in conformity with the invention, in sharp contrast to untreated magnetic powders and even as compared with those treated with a hydrocarbon type organic polymer film.

| Magnetic powder used for tape | Squareness ratio, Br/Bm | Dusting q'ty, mg |
|---|---|---|
| Untreated $\gamma$-Fe$_2$O$_3$ | 0.78 | 1.1 |
| Untreated Co-doped $\gamma$-Fe$_2$O$_3$ | 0.79 | 1.0 |
| Example 1 | 0.94 | 0.2 |
| Example 2 | 0.93 | 0.2 |
| Example 3 | 0.89 | 0.3 |
| Example 4 | 0.94 | 0.2 |

-continued

| Magnetic powder used for tape | Squareness ratio, Br/Bm | Dusting q'ty, mg |
|---|---|---|
| Example 5 | 0.87 | 0.5 |
| Example 6 | 0.88 | 0.4 |
| Example 7 | 0.92 | 0.2 |
| Example 8 | 0.92 | 0.2 |
| Comp. Ex. 1 | 0.84 | 0.8 |
| Comp. Ex. 2 | 0.85 | 0.7 |

As described hereinbefore, the present invention markedly improves the dispersibility of magnetic powders in binders, thus significantly contributing to the qualitative improvement and stability of magnetic recording media.

What is claimed is:

1. A magnetic powder for use in magnetic recording mediums comprising individual magnetic particles of the powder, said particles being individually coated with a thin film of nitrogen- or sulfur-containing organic polymer synthesized thereon by plasma polymerization.

2. The powder in claim 1 wherein the film is not more than 100 Å in thickness.

3. A magnetic recording medium comprising a substrate and a magnetic layer on said substrate, said magnetic layer comprising a binder and a plurality of individual magnetic particles, said individual particles being coated with a thin film of nitrogen- or sulfur-containing organic polymers synthesized thereon by plasma polymerization.

4. A method of improving dispersibility of magnetic powder particles in the binder of a magnetic recording medium comprising the step of coating the individual magnetic powder particles with a thin film of nitrogen- or sulfur-containing organic polymer by plasma polymerization.

5. A magnetic powder for use in magnetic recording mediums comprising individual magnetic particles of the powder, said particles being individually coated with a thin film of nitrogen- or sulfur-containing organic polymers synthesized thereon by plasma polymerization, said nitrogen- or sulfur-containing organic polymers being substantially fluorine-free.

6. The powder in claim 5 wherein the film is not more than 100 Å in thickness.

7. A magnetic powder for use in magnetic recording mediums comprising the individual magnetic particles of the powder, said particles being individually coated with a thin film of nitrogen- or sulfur-containing organic polymer synthesized thereon by plasma polymerization, said nitrogen-containing organic polymer selected from the group consisting of imidazole, pyrazole, triazole, tetrazole, benzoxazole, benzothiazole, benzoimidazole, benzotriazole, oxathiazole, benzoxythiazole, indole, indolenine, oxyindole, carbazole, nitrocarbazole, aminocarbazole, pyridine, picoline, ethylpyridine, propylpyridine, isopropylpyridine, butylpyridine, dimethylpyridine, trimethylpyridine, 2-vinylpyridine, 3-vinylpyridine, 4-vinylpyridine, 2-methyl-5-vinylpyridine, 5-ethyl-2-vinylpyridine, 3-allylpyridine, 2-benzylpyridine, 4-benzylpyridine, phenylpyridine, 2,2'-dipyridyl, 2,3'-dipyridyl, 2,4'-dipyridyl, chloropyridine, bromopyridine, nitropyridine, aminopyridine, aminomethylpyridine, cyanopyridine, quinoline, propylquinoline butylquinoline, phenylquinoline, lepidine, methylquinoline, nitroquinoline, isoquinoline, methylisoquinoline, nitroisoquinoline, acridine oxazine, thiazine, benzothiazine, pyridazine, aminopyridazine, cinnoline, aminocinnoline, pyrimidine, aminopyrimidine, pyrazine, 2-methylpyrazine, 2,5-dimethylpyrazine, piperazine, quinoxaline, triazine, tetrazine, nitromethane, nitroethane, nitropropene, nitrobutane, nitrohexane, nitroethylene, nitropropene, nitrobutene, nitropentadiene, nitropentene, nitrohexene, nitroheptene, nitrooctene, dinitroethane, dinitropropane, trinitromethane, tetranitromethane, methylamine, trimethylamine, isobutylamine, isoamylamine, methylenediamine, ethylenediamine, 1,2,3-triaminopropane, ethyleneimine, trimethyleneimine, cyclic polymethyleneimine, dipropargylamine, tripropargylamine, N,N-dimethylpropargylamine, N,N-diethylpropargylamine, nitrobenzene, dinitrobenzene, nitrosobenzene, nitrotoluene, toluidine, N-methylaniline, N-ethylaniline, N,N-dimethylaniline, N,N-diethylaniline, diphenylamine, formanilide, N-methylpyrrolidone, and vinylpyrrolidone, and said sulfur-containing organic polymer selected from the group consisting of thiazole, isothiazole, thiadiazole, thiatriazole, oxathiazole, benzoxathiazole, thiazine, benzothiazine, trimethylene sulfide, thiophene, methylthiophene, dimethylthiophene, trimethylthiophene, ethylthiophene, isopropylthiophene, 2-vinylthiophene, 3-vinylthiophene, 2-thienylacetylene, 3-thienylacetylene, nitrothiophene, aminothiophene, thianaphthene, dithiolan, oxathiolan, tetrahydrothiopyran, thiachromangithiane, methyl mercaptan, ethyl mercaptan, allyl mercaptan, ethyl sulfide, vinyl sulfide, allyl sulfide, thidiglycol, trithioacetone, methylene dimethyl mercaptal, acetone diethyl mercaptol, ethanethiolic acid, ethanethionic acid, ethanethionothionic acid, thioformamide, methyl sulfoxide, ethyl sulfoxide, divinyl sulfone, diallyl sulfone, allylvinyl sulfone, methanesulfonic acid, ethanesulfonic acid, propanesulfonic acid, butanesulfonic acid, pentanesulfonic acid, hexanesulfonic acid, ethylenesulfonic acid, 1-propane-1-sulfonic acid, thiophenol, thiocresol, thionylaniline, benzenesulfonic acid, benzenesulfinic acid, methyl toluenesulfonate ester, and phenolsulfonic acid.

* * * * *